Oct. 13, 1970  L. H. LIN  3,533,673
INFORMATION REDUCTION BY FOURIER TRANSFORM SAMPLING

Filed March 13, 1968  3 Sheets-Sheet 1

INVENTOR
L. H. LIN
BY
Roderick B Anderson
ATTORNEY

Oct. 13, 1970     L. H. LIN     3,533,673
INFORMATION REDUCTION BY FOURIER TRANSFORM SAMPLING
Filed March 13, 1968     3 Sheets-Sheet 2

Oct. 13, 1970   L. H. LIN   3,533,673
INFORMATION REDUCTION BY FOURIER TRANSFORM SAMPLING
Filed March 13, 1968   3 Sheets-Sheet 3

3,533,673
INFORMATION REDUCTION BY FOURIER TRANSFORM SAMPLING
Lawrence H. Lin, Chatham, N.J., assignor to Bell Telephone Laboratories, Incorporated, Murray Hill and Berkeley Heights, N.J., a corporation of New York
Filed Mar. 13, 1968, Ser. No. 712,838
Int. Cl. G02b 27/22
U.S. Cl. 350—3.5                5 Claims

ABSTRACT OF THE DISCLOSURE

A Fourier transform of an illuminated object is formed, and a hologram is made of a number of discrete portions of the transform. At a convenient location, this hologram is then reproduced in large numbers to form a second hologram in which identical discrete portions of the hologram of the transform are located near one another. Finally, the second hologram is illuminated to reconstruct an image of the original object.

Alternatively, an integral photograph may be made of a number of discrete portions of the Fourier transform of an illuminated object. This integral photograph is then reproduced in large numbers to form a second integral photograph analogous to the second hologram formed as above; and the second photograph is illuminated to reconstruct an image of the original object.

BACKGROUND OF THE INVENTION

When an object is illuminated, it modulates the illuminating beam so as to form a beam of light that carries information about the object. A record, called a hologram, can be made of the phase and amplitude of this information-bearing beam by interfering on a recording medium, such as a photographic plate, the wavefronts of the information beam and a reference beam. Proper illumination of the hologram reconstructs therefrom the stored information-bearing beam and therefore an image of the stored object.

The copending application of R. J. Collier, L. H. Lin and K. S. Pennington for "Hologram Techniques," Ser. No. 587,606, filed Oct. 18, 1966, and assigned to Bell Telephone Laboratories, Incorporated, the assignee of this application, describes a technique for increasing the storage capacity of a hologram by sampling. That application teaches that a mask be inserted in the light beams immediately in front of the recording medium so that the light beams impinge on only small areas of the medium. If the individual areas upon which the recording is made are sufficiently numerous and well dispersed throughout the medium, an image of the object recorded can be reconstructed from the sampled hologram by a proper illumination. Typically, a mask of narrow parallel stripes that are alternately transparent and opaque is used for recording.

By thus exposing only a small area of the recording medium to the interfering wavefronts, the amount of information about the object that is stored in the hologram is greatly reduced. This reduction in information stored can be used to advantage in several ways. By reducing the information stored about any given object, it becomes possible to store more information about other objects; for example, several more sampled holograms can be stored on a single recording medium. And if the hologram information is transmitted by means such as facsimile, a reduction in the amount of information to be transmitted reduces either the time or the radio frequency bandwidth required to transmit it.

However, the hologram that is produced by Messrs. Collier, Lin and Pennington can be annoying to look at, especially when only a relatively small amount of the hologram area contains the information being reconstructed, because only those portions of the hologram that contain that information diffract virtual image light to the eye of a viewer. Under such conditions, the reconstructed image is seen by the eye as though it were viewed through the mask used to limit the exposure of the recording medium to a small area. Thus if the mask is an array of parallel stripes, several black lines are seen on the image stored in the hologram. Because what the eye sees of the image is restricted in much the same way as the view of an object is restricted when looking at it through a screen, this phenomenon will be referred to as screen effect.

The copending application of C. B. Burckhardt for "A Method for Improving the Reconstruction of Information Stored in Only Selected Areas of a Hologram," Ser. No. 641,870, filed May 29, 1967, and assigned to Bell Telephone Laboratories, Incorporated, describes a method for eliminating screen effect by forming a second hologram with the reconstructed waveform from the sampled hologram. Reconstruction of the information stored in Burckhardt's second hologram produces a satisfactory image. However, the storage process requires frequent changes in the spatial relation between the sampled hologram and the second hologram and compensating adjustments in the angle at which the sampled hologram is illuminated during reconstruction.

SUMMARY OF THE INVENTION

Accordingly it is an object of my invention to increase the storage capacity of a hologram.

It is a further object of my invention to increase the storage capacity of a hologram by recording a given amount of information in only limited areas of a hologram.

It is still a further object of my invention to improve the reconstruction of information recorded in only limited areas of a hologram.

These and other objects are achieved in an illustrative embodiment of my invention by first forming a Fourier transform of the light beam produced by illuminating the object to be recorded. As is known, a Fourier transform of the amplitude and phase distribution of light at a first location in a light beam is simply an amplitude and phase distribution at a different location that is a mathematical Fourier transform of the first distribution. The Fourier transform may be made optically in several ways. To instance an easily described method, if the object that is illuminated to form the information beam is situated in the front focal plane of a lens, then the Fourier transform of the information beam is formed in the rear focal plane, which is also called the Fourier transform plane. A hologram of the transform can then be made by interfering the transform with a reference beam and recording the resulting interference pattern on a suitable recording medium.

Preferably, however, the Fourier transform hologram is formed more simply without a lens following a method explained by G. W. Stroke in "Lensless Fourier Transform Method for Optical Holography," Applied Physics Letters, Vol. 6, No. 10, p. 201 (May 15, 1965). Briefly, the Stroke technique teaches the use of a spherical wavefront reference beam and a particular arrangement of illuminated object, reference beam source and recording medium.

Because a single portion of a Fourier transform hologram of an object contains information about all of the object, it is tempting to make a hologram of only a single portion and thereby greatly reduce the information stored in the hologram. If, however, an attempt is made to reconstruct the image of the object from this hologram of only a single portion, the reconstruction will most likely be of poor quality because good resolution can be achieved only by recording several different samples of the Fourier transform. Moreover, if the recorded portion of the transform is small compared to the object recorded, only a portion of the image is observed because of screen effect.

Accordingly, to improve the resolution of the reconstructed image, I record not one but several discrete portions of the Fourier transform and achieve good resolution with an information reduction of from $10^2$ to $10^3$. To avoid screen effect when reconstructing the image stored in the Fourier transform hologram, I form a second hologram, all portions of which diffract virtual image light to the eye of a viewer. This hologram comprises a number of copies of the first hologram so arranged that identical discrete portions of the first hologram are located near one another and oriented in the same direction. The second hologram is conveniently formed by contact printing the first hologram in a step-and-repeat operation.

My invention takes advantage of the position insensitivity of an image reconstructed from a Fourier transform hologram; for no matter where such a hologram is situate in the Fourier transform plane, as long as its orientation is constant it reconstructs a single image. Thus when I illuminate a second hologram composed of several identical Fourier transform holograms situate in different locations of the Fourier transform plane but oriented in the same direction, I reconstruct a wavefront that produces without screen effect a single image of the object recorded in the several discrete portions of the first hologram.

Alternatively, the objects of my invention are achieved by forming a Lippmann integral photograph of the Fourier transform of the light beam produced by illuminating the object to be recorded. This process is similar to that used in the first embodiment of my invention. However, a Fourier transforming lens is used; the light beam projected from the Fourier transforming lens is projected onto an array of tiny spherical lenses, sometimes called fly's eye lenses, that images the beam onto a recording medium; and no reference beam is used. Similar sampling techniques are used to record only several discrete portions of the Fourier transform and similar reduplication techniques are used to form a second integral photograph that when illuminated reconstructs the image stored therein without screen effect.

BRIEF DESCRIPTION OF THE DRAWING

These and other objects and features of my invention will be more readily understood from the following detailed description taken in conjunction with the accompanying drawing in which.

DETAILED DESCRIPTION OF THE DRAWING

Figure 1:
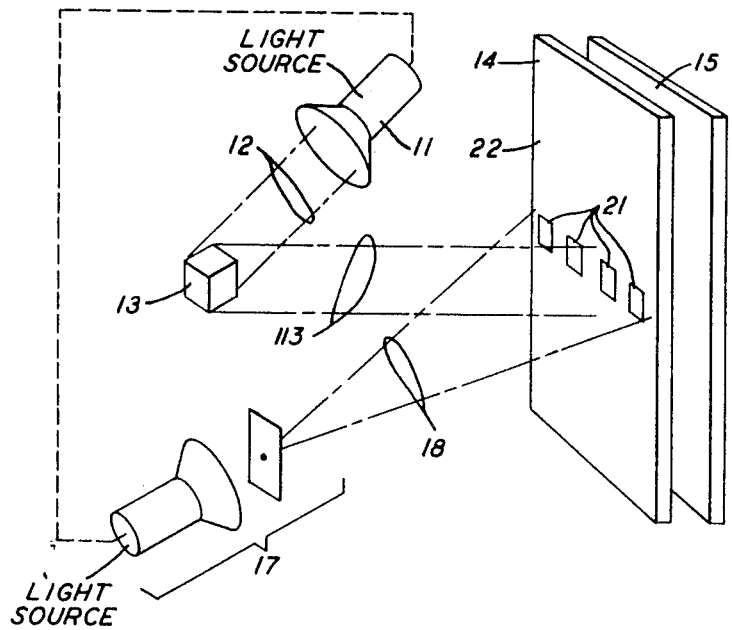
FIG. 1 is a schematic illustration of apparatus used to form a Fourier transform hologram as the first step in one embodiment of the present invention.

Referring now to the illustrative embodiment depicted in FIG. 1, there is shown the apparatus used to form and sample a lensless Fourier transform hologram. As its name suggests, this hologram is formed without a lens, thereby simplifying the apparatus and the recording process. The apparatus comprises a coherent light source 11, a three-dimensional object 13 of which the hologram is to be made, a mask 14, a recording medium 15, typically, a photographic plate, in contact with mask 14 and a coherent light point source 17. As explained in the aforementioned letter of G. W. Stroke, a spherical wavefront 18 produced by point source 17 is used to form a lensless Fourier transform hologram. To form a close approximation to such a hologram it is also necessary that point source 17 and the center of object 13 both be equidistant from recording medium 15 and that both the size of object 13 and the distance between object 13 and point source 17 be small compared to the distance between object 13 and medium 15. Although mask 14 could comprise an array of parallel transparent and opaque stripes, for reasons that will be explained below it preferably comprises a single line of relatively widely spaced transparent windows 21 in an opaque region 22. As a result, only certain widely spaced discrete portions of medium 15 can be exposed through mask 14 at any given time.

Because reference beam 18 emanating from source 17 is phase related to object beam 12 emanating from source 11, it is best to use a system of beam splitter and mirrors to derive reference beam 18 from object beam 12. However, to avoid undue complication of FIG. 1, the common origin of the two beams is indicated by a dotted line between source 11 and source 17.

To form the Fourier transform hologram, object beam 12 is directed from source 11 onto object 13 to form an information-bearing beam 113 that is reflected onto recording medium 15. At the same time, phase related reference beam 18 is directed from source 17 onto photographic plate 15. Interference between beams 113 and 18 forms a set of interference fringes on mask 14. Samples of these interference fringes are incident on the portions of recording medium 15 situate behind transparent windows 21 of mask 14; and a record is made of the set of sampled fringes. Of course, that portion of medium 15 located behind the opaque region 22 of mask 14 is not exposed.

The necessary steps are then taken to preserve the record of the fringes formed on medium 15. If, for example, the recording medium is an ordinary photographic emulsion, the emulsion must be developed and fixed; and it may be desirable to form a positive of the photographic record. In any event, the resultant record constitutes a hologram. Because I will have occasion below to refer to both a single recorded sample of the interference fringes as well as the set of recorded samples of the interference fringes, I must emphasize that the word "hologram" refers to the set of recorded samples while the phrase "a discrete portion of the hologram" refers to a single recorded sample of the interference fringes.

Inasmuch as information-bearing beam 113 is formed by directing object beam 12 at object 13, the interference fringes formed on mask 14 are characteristic of object 13. Moreover, because the pattern of interference fringes typically varies across the surface of mask 14, each sample incident on a portion of recording medium 15 is different. However, because enough well-dispersed samples are taken of the interference pattern associated with object 13, a high resolution image of object 13 is reconstructed by illuminating merely the hologram of the set of sampled fringes.

Figure 2:
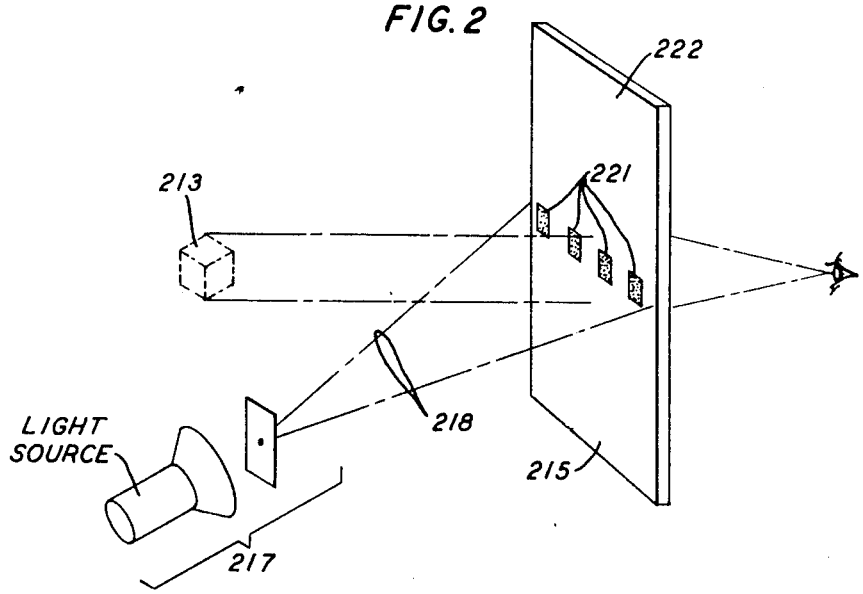
FIG. 2 is a schematic illustration of apparatus used to reconstruct a virtual image of the object stored in a hologram by using the apparatus of FIG. 1.

Typical illumination apparatus is shown in FIG. 2. There, a positive of the developed recording medium, shown generally as element 215 and comprising the hologram, shown as element 221, in an otherwise opaque medium 222, is mounted where it can be illuminated by a spherical reference beam 218 emanating from a point source of coherent light 217. As is well known in the art, medium 215 must have the same location relative to point source 217 that recording medium 15 has to point source 17 when the interference fringes are formed. Consequently, beam 218 is similar in direction and the shape of its wavefronts to reference beam 18 of FIG. 1. Under such conditions, when hologram 221 is illuminated by beam 218, a viewer, situated as indicated in FIG. 2, sees a virtual image 213 of object 13 recorded in hologram 221.

However, unless further processing is first performed on hologram 221, virtual image 213 is marred because only those areas of medium 215 that contain the hologram information stored during the exposure diffract light to the eye of the viewer. The remaining area 222 of medium 215 is opaque and, of course, blocks the light. As a result, virtual image 213 appears as though it were viewed through the opaque area 222 of medium 215; and because the opaque area is substantial, this can be a serious inconvenience.

To eliminate this screen effect, I propose that the hologram made on discrete portions of recording medium 15 be reproduced on a suitable recording medium as many times as is necessary to fill the space between the recorded portions, thereby eliminating any opaque areas. This can be accomplished by any number of substantially equivalent step-and-repeat operations. In one such method, a hologram is formed, as is described in conjunction with FIG. 1, by the exposure of several discrete portions of recording medium 15 to the interference fringes transmitted through mask 14. The hologram so made is then transmitted by, for example, electrical or mechanical means to the location where the image of the object recorded is to be reconstructed. There the hologram is used repeatedly to contact print a second recording medium. By stepping the hologram between each printing to an unprinted part of the second recording medium, all of the recording medium can eventually be filled with identical prints of the hologram, thereby forming a second hologram, which will be referred to below as the step-and-repeat hologram. Assuming that the second recording medium is so filled and that there is no overlapping, the total number of identical prints of the hologram is, of course, equal to the total area of the second recording medium divided by the total area of windows 21 through which the original hologram is made.

Figure 3:
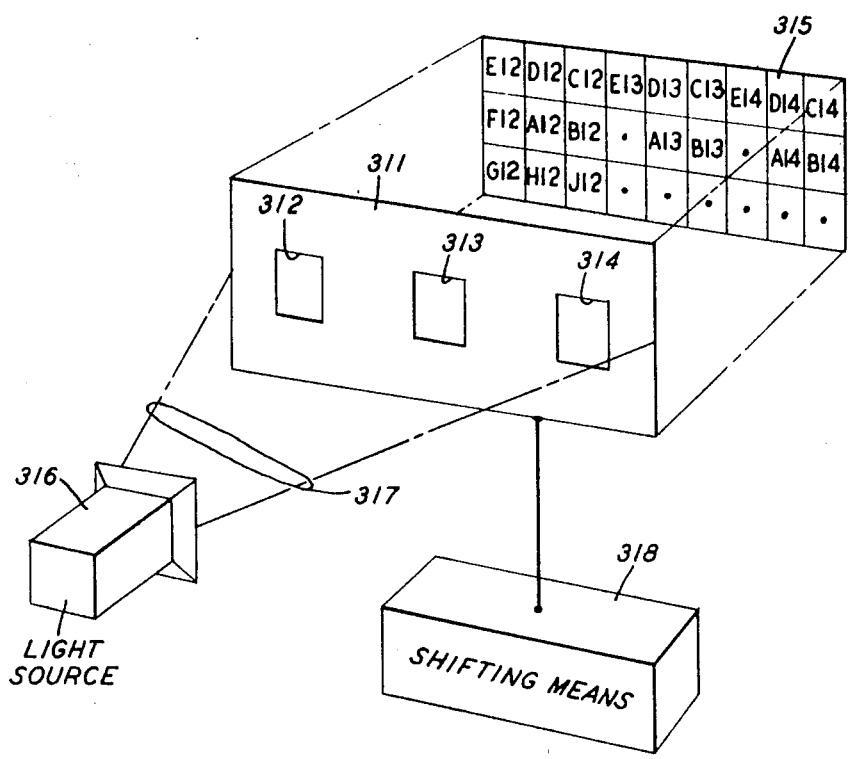
FIG. 3 is a schematic illustration of apparatus used to eliminate screen effect in accordance with one embodiment of the present invention.

An illustrative sequence in which several identical prints are made on a recording medium and the interrelation of these prints is shown in FIG. 3. On a first recording medium 311 are depicted three discrete but adjacent portions 312, 313 and 314 of a hologram formed as detailed in FIG. 1. It is to be understood, however, that the hologram typically has many more than three discrete portions, as is made clearer in an example given below. The remaining area of medium 311 that is shown in FIG. 3 is opaque. Although for illustrative purposes in FIG. 3 medium 311 is shown removed from a second recording medium 315, medium 311 is preferably in actual contact with medium 315 during at least the exposure portions of the step-and-repeat operation. Opposite medium 311 a light source 316 is so positioned that it can direct a beam of light 317 through portions 312, 313 and 314 of medium 311 onto medium 315.

Thus, by illuminating medium 311 with light beam 317, a contact print is made of the information recorded in the discrete portions 312, 313 and 314 of the hologram. Such illumination exposes on recording medium 315 areas A12, A13 and A14 that are in contact with areas 312, 313 and 314, respectively, of medium 311.

After this illumination, medium 311 is shifted by an appropriate shifting means 318 so that areas 312, 313 and 314 no longer contact areas A12, A13 and A14 of medium 315. Illustratively, medium 311 is shifted so that portions 312, 313 and 314 of the hologram contact areas B12, B13 and B14, respectively, on medium 315; and these areas are then exposed. Similar shifts and exposures expose areas C, D, E, F, G, H, and J successively to fill completely recording medium 315. The complete record, here comprising nine identical records with the same orientation, is then suitably processed to form the step-and-repeat hologram.

Although screen effect is eliminated regardless of the precise shifting pattern used to expose all of medium 315, good image reconstruction is achieved only if all the copies of each discrete portion are located close to one another on medium 315. As part of this requirement, it is also necessary that the areas on medium 315 taken up by each complete set of copies of a discrete portion be substantially the same shape. This requirement arises because each different sample of the interference fringes and therefore each discrete portion of the hologram contains a record of its spatial relation with every other sample. Even though the image reconstructed from a Fourier transform hologram is insensitive to the position of the hologram in the Fourier transform plane, an image reconstructed from an array of portions of a Fourier transform hologram is not insensitive to the position of the portions of the hologram with respect to one another.

Figure 4:
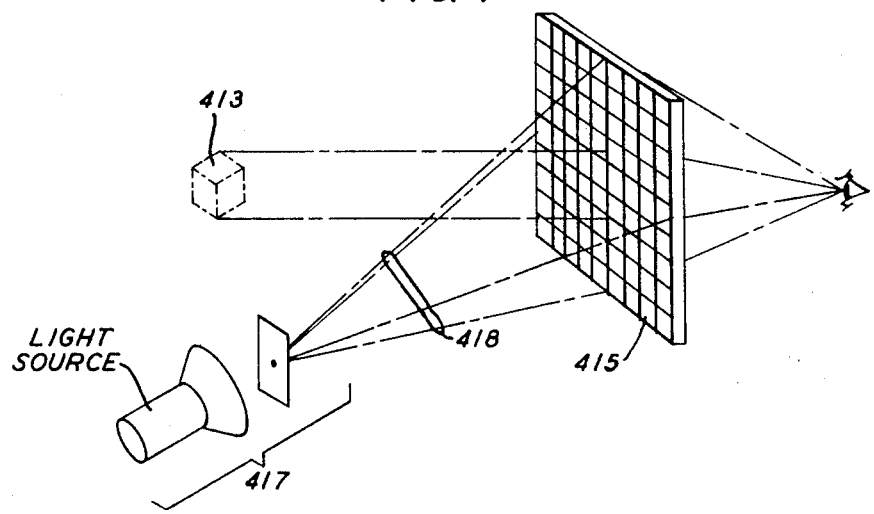
FIG. 4 is a schematic illustration of apparatus used to reconstruct a virtual image of the object stored in a hologram formed by the apparatus of FIGS. 1 and 3.

As shown in FIG. 4, the step-and-repeat hologram, depicted as element 415, is viewed with apparatus similar to that of FIG. 2. Hologram 415, on which is sketched a grid pattern to indicate the multiple copies of discrete portions of the hologram, is mounted where it can be illuminated by a spherical reference beam 418 emanating from a point source of coherent light 417. As in the case of hologram 215 and point source 217 of FIG. 2, the spatial relationship between step-and-repeat hologram 415 and point source 417 is the same as that between recording medium 15 and point source 17 of FIG. 1. The hologram is then illuminated, and a viewer situated as indicated in FIG. 4 sees a virtual image 413 of object 13 recorded in the step-and-repeat hologram.

Because there are no opaque regions on the step-and-repeat hologram, the virtual image reconstructed from that hologram will not be marred by screen effect. Moreover, because each hologram in the step-and-repeat hologram is a Fourier transform hologram and because the image reconstructed from such a hologram does not shift in position depending on the location of the Fourier transform holograms in the step-and-repeat hologram, virtual image 413 will not be blurred.

The reason the position of the reconstructed image is insensitive to the position of the lensless Fourier transform hologram is that the spherical wavefront emanating from the point source of illumination is incident on each differently located Fourier transform hologram at a different angle. A hologram is essentially a diffraction grating. Because light is incident at a different angle on each differently located hologram in the step-and-repeat hologram, it is diffracted from each one at a different angle. If, however, each of these holograms is located in the same plane and if this plane is the same distance from the point source as was the plane in which the original hologram was located when it was formed, then the different diffraction angles are just different enough to form from the differently located Fourier transform holograms diffracted beams that appear to come from a single image.

In practicing my invention I have made hologram recordings of an object 13 that was 8 centimeters (cm.) high and 3 cm. deep. Point source 17 was located 8 cm. from the center of object 13; and both point source 17 and the center of object 13 were situate 22 cm. from recording medium 15. The recording medium was 10 cm. high and 13 cm. wide. I used a variety of masks, obtaining the best compromise between the amount of information reduction and the quality of the reconstructed image from a mask similar to that shown in FIG. 1 in which the height of a window 21 was 1 mm., the width of the window was 0.6 mm. and the distance between the nearer sides of adjacent windows was 5.4 mm. Consequently this mask had approximately twenty windows 21 and allowed exposure of only one-thousandth of the recording medium, thereby reducing the information stored on the recording medium by a factor of $10^3$.

Because each portion of the interference pattern recorded has little vertical extension and because the portions recorded extend only across a horizontal segment of the interference pattern, the image that is reconstructed from the hologram so formed has little or no vertical parallax. As is known in the art, portions along vertical segments of the interference fringes would have to be recorded to form an image with vertical parallax. Such a recording can easily be accomplished with my invention by using a mask consisting of several rows of transparent windows instead of the single row of windows now shown in FIG. 1. Suitable modification of the step-and-repeat operation will be obvious. However, for many applications vertical parallax is not necessary. For example, when viewing a hologram a viewer's eyes are normally horizontal with respect to the horizontal direction in the hologram, and there is little head motion in the vertical direction. Hence, vertical parallax is not observed, and there may be no need to record it.

As will be obvious to those skilled in the art, there are numerous modifications to my invention. For example, though it may be somewhat less convenient, the Fourier transform can be made with a lens. To do this, the object to be recorded is situate in the front focal plane of the lens and the mask and recording medium in the rear focal plane of the lens. The hologram is formed by interfering a reference beam with the transform formed by the lens. For reconstruction, the hologram is positioned so that it is situate in one focal plane of a second lens. The hologram is then illuminated and the image is seen in the other focal plane of the second lens.

As was mentioned above, there are also many equivalent ways to step-and-repeat the hologram. For example, when forming the hologram with the apparatus of FIG. 1, a first exposure of recording medium 15 can be made. If the mask is held constant and if the recording medium is shifted so as to conceal behind the mask the previously exposed portion, a second exposure identical to the first but in a different position on the recording medium can be made. This procedure can be repeated as many times as necessary to fill up the recording medium. The hologram so formed will reconstruct an image of the object recorded that is identical with the image reconstructed from the step-and-repeat hologram formed by contact printing.

Figure 5A:
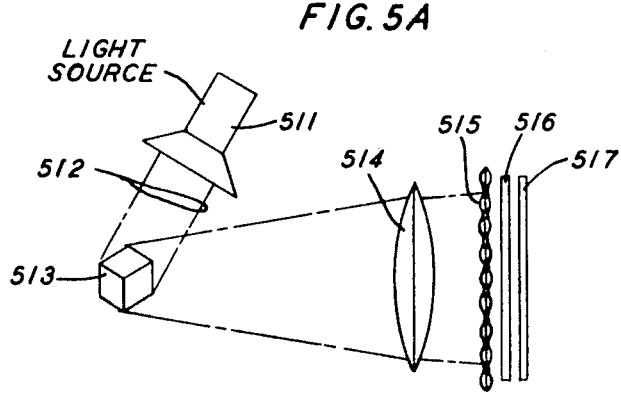
FIG. 5A is a schematic illustration of apparatus used to form a Fourier transform integral photograph as the first step in a second embodiment of the present invention.
Figure 5B:
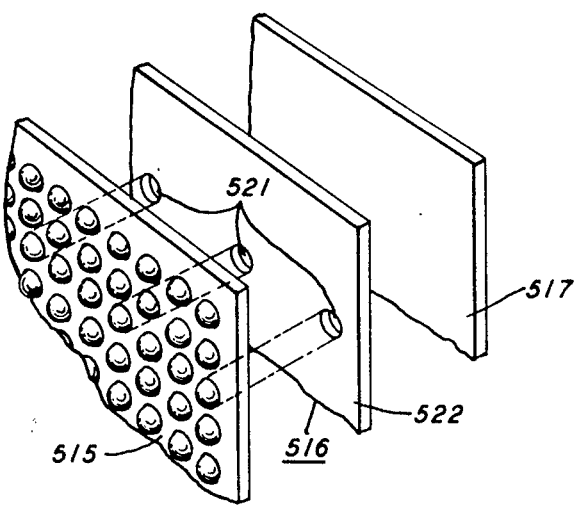
FIG. 5B is a blown-up perspective view showing the relation between certain elements of the apparatus of FIG. 5A.

Moreover, as an alternative to forming a Fourier transform hologram, a Fourier transform Lippmann integral photograph may be formed with the apparatus of FIGS. 5A and 5B. The properties of the Lippmann photograph are more extensively described in H. E. Ives' article, "Optical Properties of a Lippmann Lenticulated Sheet," J. Opt. Soc. Amer., 21, 171 (March 1931); and these properties are utilized to form a photograph that can be illuminated to produce a three-dimensional image unimpaired by screen effect.

The apparatus depicted in FIG. 5A comprises a light source 511, a three-dimensional object 513, a large field lens 514, an array of spherical lenslets referred to as fly's eye lens 515, a mask 516 and a recording medium 517. Object 513 is located in the front focal plane of lens 514, and medium 517 in the rear focal plane of lens 515. Unlike the light sources in FIG. 1, light source 511 need not be coherent because a three-dimensional image can be reconstructed from an integral photograph even if the light source is incoherent.

As shown in the blown-up perspective view of FIG. 5B, mask 516 is similar to mask 14 of FIG. 1; for it comprises a single line of relatively widely spaced transparent windows 521 in an opaque region 522. In this case, however, the shape of transparent windows 521 is circular because mask 516 is aligned with lens 515 so that each of its transparent windows 521 is behind one of the spherical lenslets of lens 515. Of course, an opaque portion of mask 516 typically is located behind the remaining spherical lenslets of lens 515.

As has been noted above, the Fourier transform of a beam is formed in the rear focal plane of a lens if the object illuminated to form the beam is situated in the front focal plane of the lens. Moreover, it can be shown that a close approximation to a Fourier transform is formed by the apparatus of FIG. 5A in the rear focal plane behind at least the center portions of those lenslets of lens 515 that are located in front of transparent windows 521 in mask 516. Therefore, to form a Fourier transform integral photograph, an object beam 512 is directed from source 511 onto object 513 whence it is reflected to lens 514. Lens 514 converges the reflected beam onto fly's eye lens 515; and samples of the beam that transits lens 515 are incident on the portions of recording medium 517 situate behind the transparent windows of mask 516. Suitable means are then taken to make a more permanent record of this set of samples.

Figure 6:
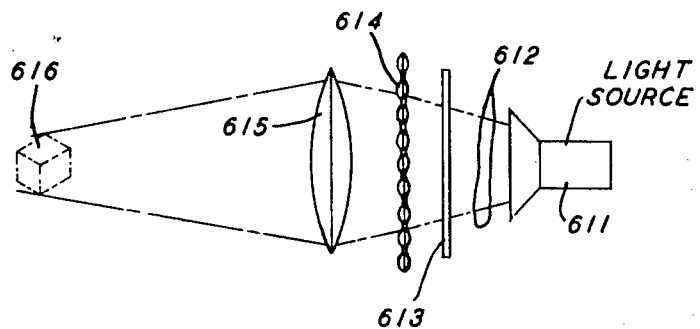
FIG. 6 is a schematic illustration of apparatus used to reconstruct a real image of the object stored in a Fourier transform integral photograph by the apparatus of FIG. 5A.

This record constitutes an integral photograph and from it can be reconstructed a three-dimensional image of object 513. The apparatus used to reconstruct such an image is shown in FIG. 6. The apparatus comprises a light source 611, an integral photograph 613, a fly's eye lens 614 and a large field lens 615, lens 614 being situated so that photograph 613 is in its front focal plane. Fly's eye lens 614 should be similar enough to fly's eye lens 515 that each of the portions of integral photograph 613 can be, and is, aligned with a lenslet that is optically equivalent to the lenslet with which the equivalent portion of recording medium 517 was aligned during the recording process detailed in FIG. 5A. An image of object 513 is formed in the rear focal plane of lens 615 by directing a beam of light 612 from light source 611 through photograph 613 and lenses 614 and 615.

However, unless further processing is first performed on the integral photograph, the quality of the reconstruction is marred by screen effect. To eliminate screen effect, I propose that the integral photograph made on discrete portions of recording medium 517 be reproduced on a suitable recording medium as many times as is necessary to fill most of the space between the recorded portions, thereby eliminating much of the opaque areas. If fly's eye lens 614 is uniform so that all of its lenslets are substantially equivalent and are arranged in a repetitive pattern, then the step-and-repeat integral photograph can be aligned with fly's eye lens 614 so that each of the re-duplicated portions of the integral photograph can be aligned with a lenslet that is optically equivalent to the lenslet with which the equivalent portion of medium 517 was aligned during the recording process of FIG. 5A. If the step-and-repeat integral photograph is situate in the front focal plane of the lens system of FIG. 6, then when it is illuminated by light beam 612 an image is formed in the rear focal plane of the lens system. This image is not marred by screen effect.

It will be appreciated that those skilled in the art may devise still other arrangements that fall within the spirit and scope of my invention.

What is climed is:

1. A method for forming a hologram of an object and reconstructing therefrom an image of the object comprising the steps of:

modulating a first light beam by illuminating the object with the beam;

forming a reference light beam that has a constant phase-relation with the first beam;

recording on separated, discrete portions of a recording medium separated discrete portions of a Fourier transform hologram of the first modulated beam and the reference beam;

making a second hologram by forming a record comprised of a plurality of duplicates of at least some of said portions so arranged that identical discrete portions of the duplicates are adjacent one another;

and illuminating the second hologram with a reconstructing beam similar in direction and shape to the reference beam to reconstruct from the duplicates that comprise the second hologram a single image of the object stored therein.

2. The method of claim 1 comprising the following steps for making the second hologram:

placing the discrete portions of the first hologram in close proximity with discrete portions of a second recording medium;

recording the first hologram on the second recording medium;

placing the discrete portions of the first hologram in close proximity with different discrete portions of the second recording medium;

and recording the first hologram on the different discrete portions of the second recording medium.

3. The method of claim 1 comprising the following steps for forming the first hologram:

interfering on a mask two beams of light, the first beam being the modulated beam and the second beam being a reference beam emanating from a point source of light located the same distance from the mask as the object that modulates the first beam;

and exposing through several discrete transparent portions of the mask discrete portions of the first recording medium.

4. The method of claim 3 wherein the discrete transparent portions of the mask that is there used are arranged in a single row.

5. A method for forming an integral photograph of an object and reconstructing therefrom an image of the object comprising the steps of:

illuminating the object to form an information-bearing beam that is directed through a first lens that is located with the object in its front focal plane, whereby a beam is formed that is an approximation to the Fourier transform of the information-bearing beam;

forming with a second lens a first integral photograph of separated discrete portions of the beam that is an approximation to the Fourier transform;

making a second integral photograph by forming a record comprised of a plurality of duplicates of at least some of said portions so arranged that identical discrete portions of the duplicates are adjacent one another; and directing an illuminating beam through the second integral photograph, the second lens and the first lens to reconstruct the image of the object stored in the second integral photograph.

References Cited

De Bitetto, Applied Physics Letters, vol. 12, No. 5, Mar. 1, 1968, pp. 176–8.

Vitols, IBM Tach. Disclosure Bull., vol. 8, No. 11, April 1966, pp. 1581–2.

DAVID SCHONBERG, Primary Examiner

R. J. STERN, Assistant Examiner

U.S. Cl. X.R.

350—131, 167